United States Patent [19]

Golob et al.

[11] 3,939,996
[45] Feb. 24, 1976

[54] TREE HARVESTING APPARATUS

[75] Inventors: Theodore B. Golob; Sylvester J. Hauck; Stanley C. Jasinski; Bruce A. Margerum, all of Ontario, Canada; Antti Jarvi, Niittykumpu, Finland

[73] Assignee: Eaton Yale Ltd., Ontario, Canada

[22] Filed: July 30, 1973

[21] Appl. No.: 384,147

Related U.S. Application Data

[62] Division of Ser. No. 888,746, Dec. 29, 1969, Pat. No. 3,796,241.

[52] U.S. Cl. .................. 214/82; 280/145; 294/106
[51] Int. Cl.² ........................................... B60P 3/00
[58] Field of Search........... 214/82, 85.5, 523, 77 R, 214/147 G; 294/88, 106; 280/145

[56] References Cited
UNITED STATES PATENTS

| | | | |
|---|---|---|---|
| 3,204,983 | 9/1965 | Rehnstrom et al. | 280/145 |
| 3,305,262 | 2/1967 | Lull | 214/82 |
| 3,321,094 | 5/1967 | Shore | 214/82 |
| 3,549,029 | 12/1970 | Rutter | 214/77 |

Primary Examiner—Robert G. Sheridan
Assistant Examiner—Donald W. Underwood
Attorney, Agent, or Firm—Teagno & Toddy

[57] ABSTRACT

An improved tree harvesting method is performed by a machine which includes a pair of booms mounted on a vehicle. A clamp assembly is mounted on a first boom for gripping a standing tree which is then severed close to the ground by a shear assembly which is also mounted on the first boom. The severed tree is positioned relative to a delimbing mechanism mounted on the second boom by moving the clamp assembly to place the tree in a generally horizontal position. The tree and clamp assembly are then pivoted about a longitudinal axis of the first boom to position the tree for engagement by the delimbing mechanism. The severed tree is delimbed by extending the second boom to move the delimbing mechanism along the trunk of the tree while the tree is gripped by the clamp assembly. When the delimbing mechanism senses or encounters a portion of the tree having a predetermined cross-sectional dimension, a topping assembly is automatically operated to top the tree by severing the tree trunk under the influence of movement of the topping assembly along the tree trunk. The log formed by delimbing and topping the severed tree is then deposited in a bunk assembly for transporting. The bunk assembly advantageously includes a support member or roller which is raised upon operation of the bunk assembly to an open condition to at least partially disengage logs from the bunk assembly.

4 Claims, 25 Drawing Figures

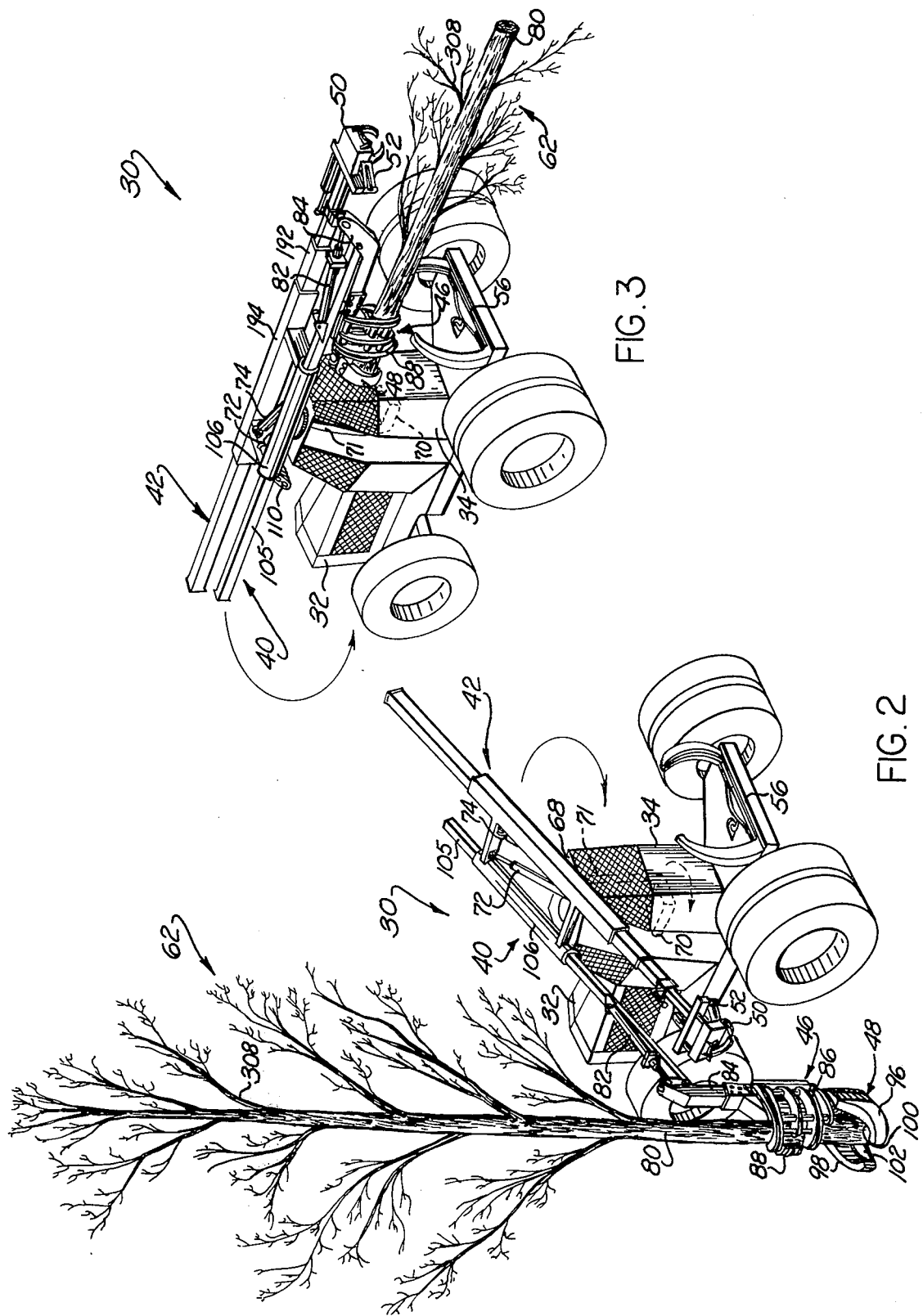

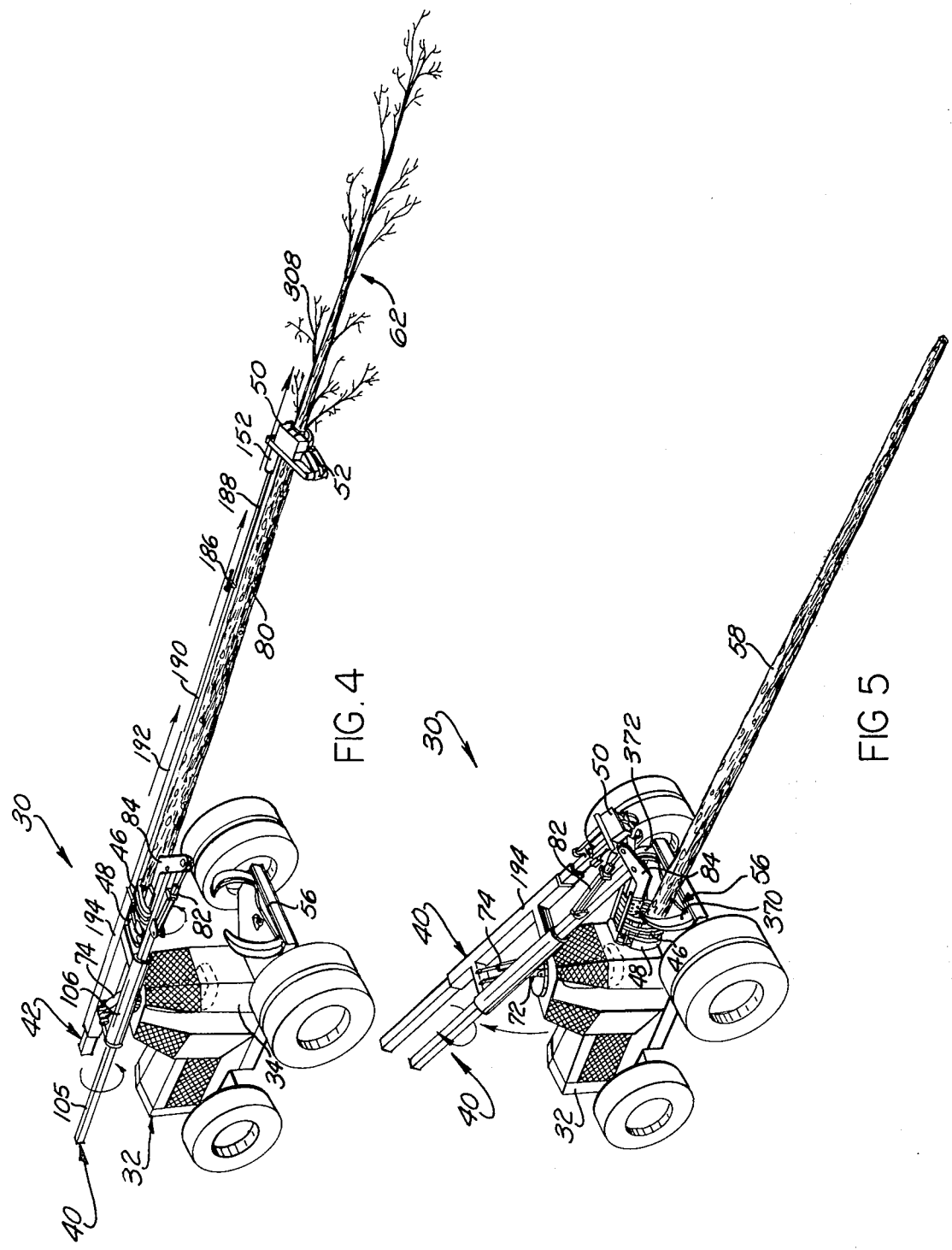

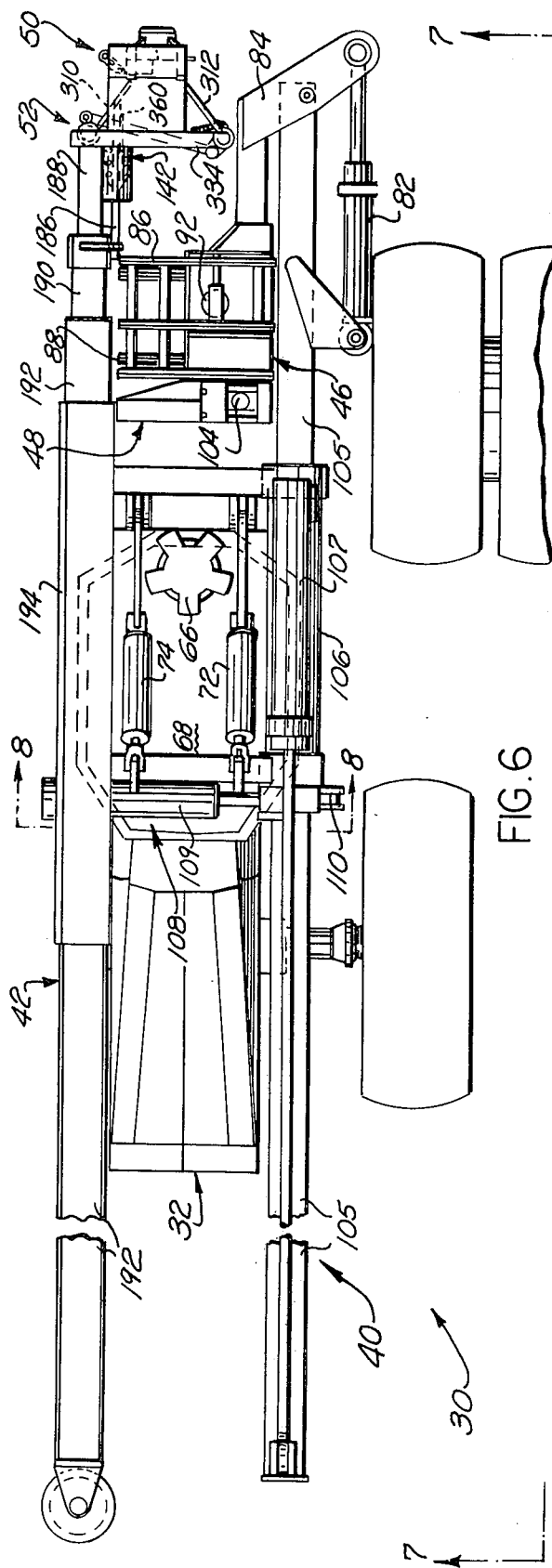
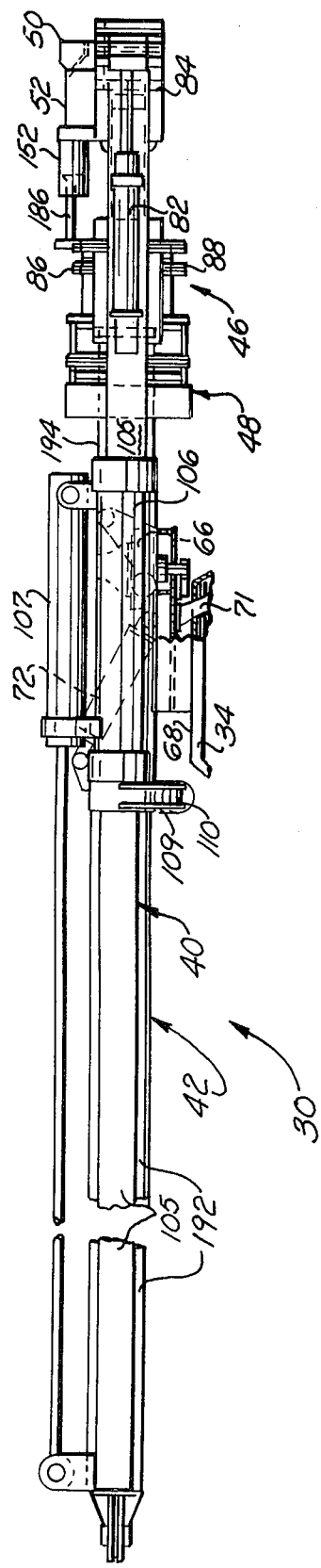
FIG. 6
FIG 7

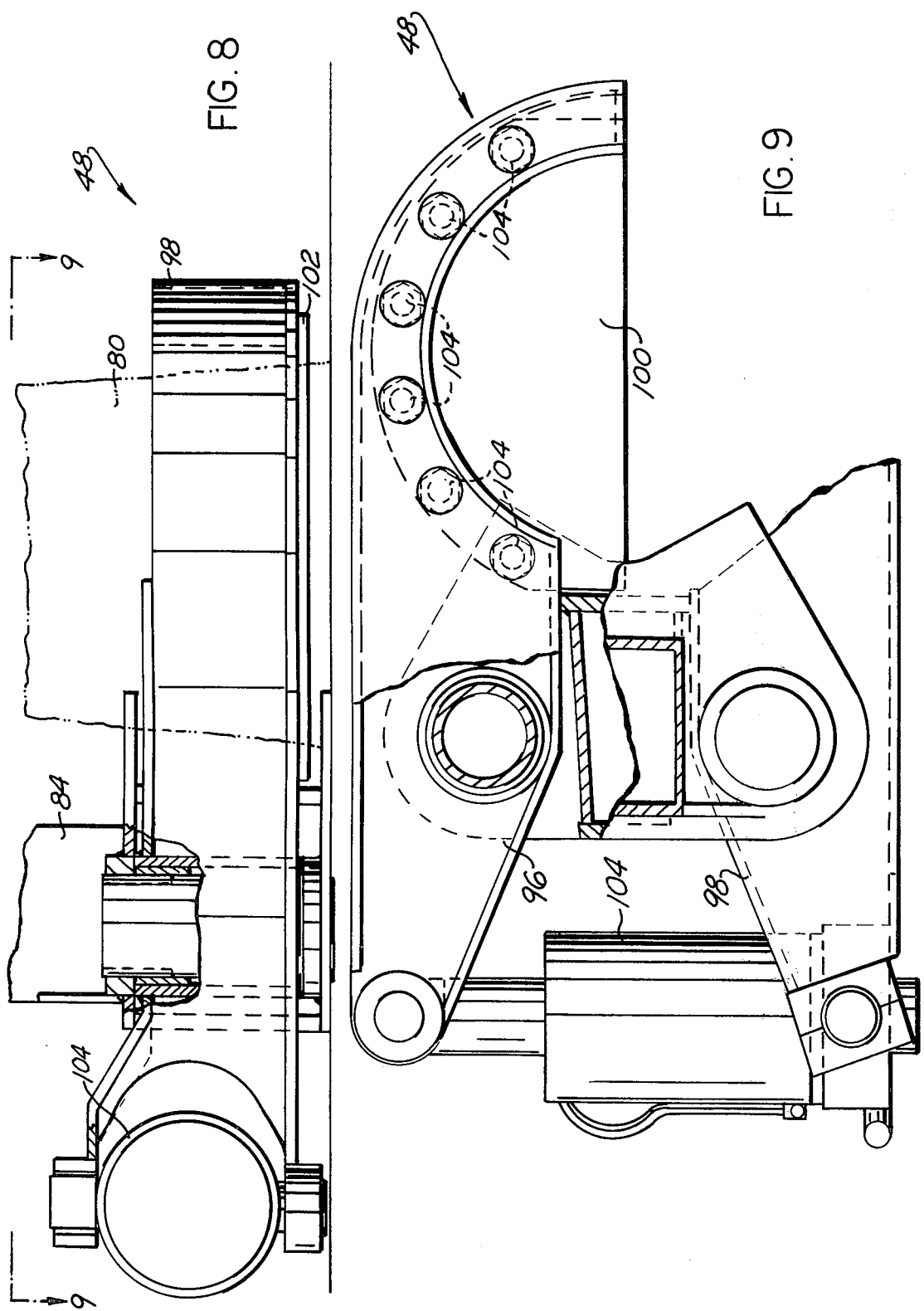

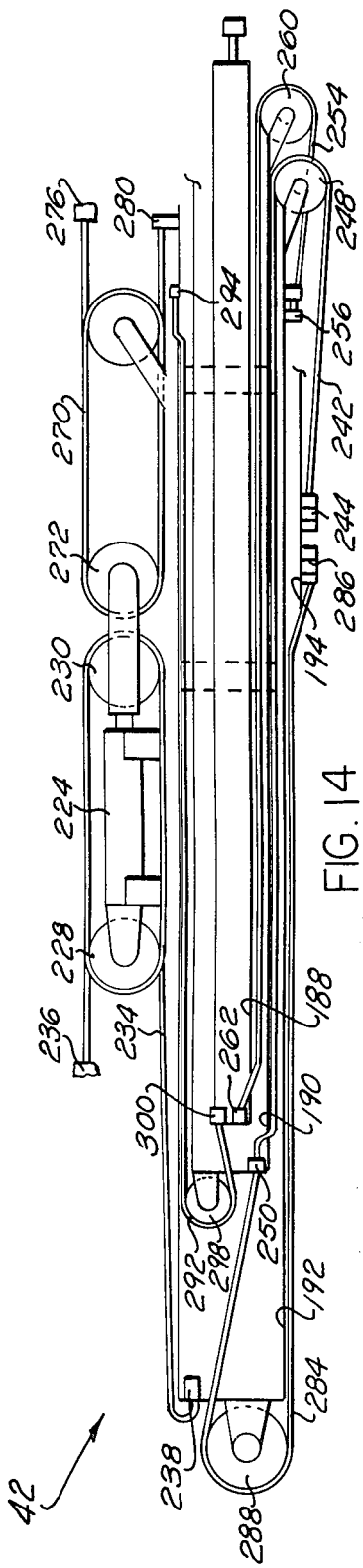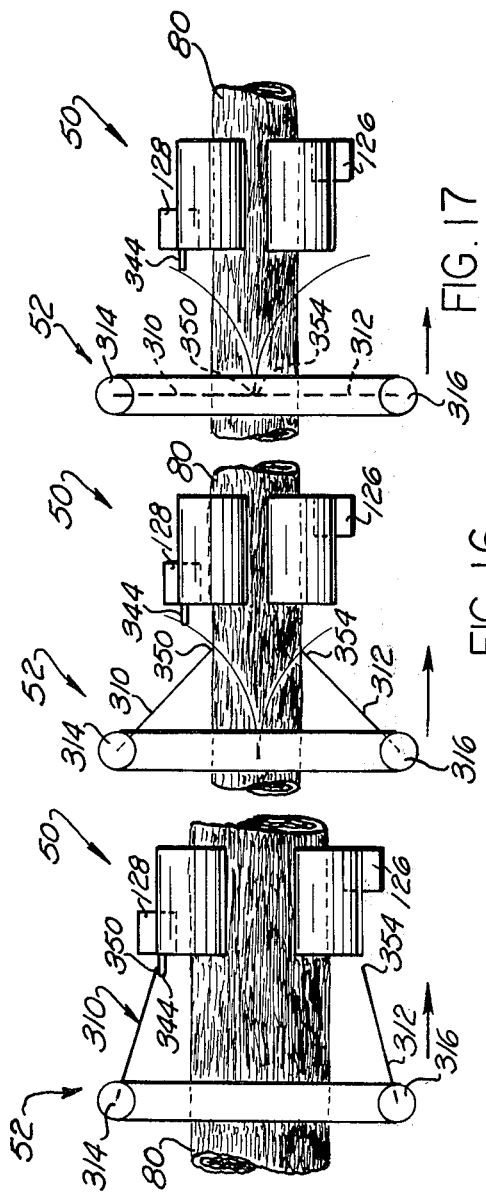

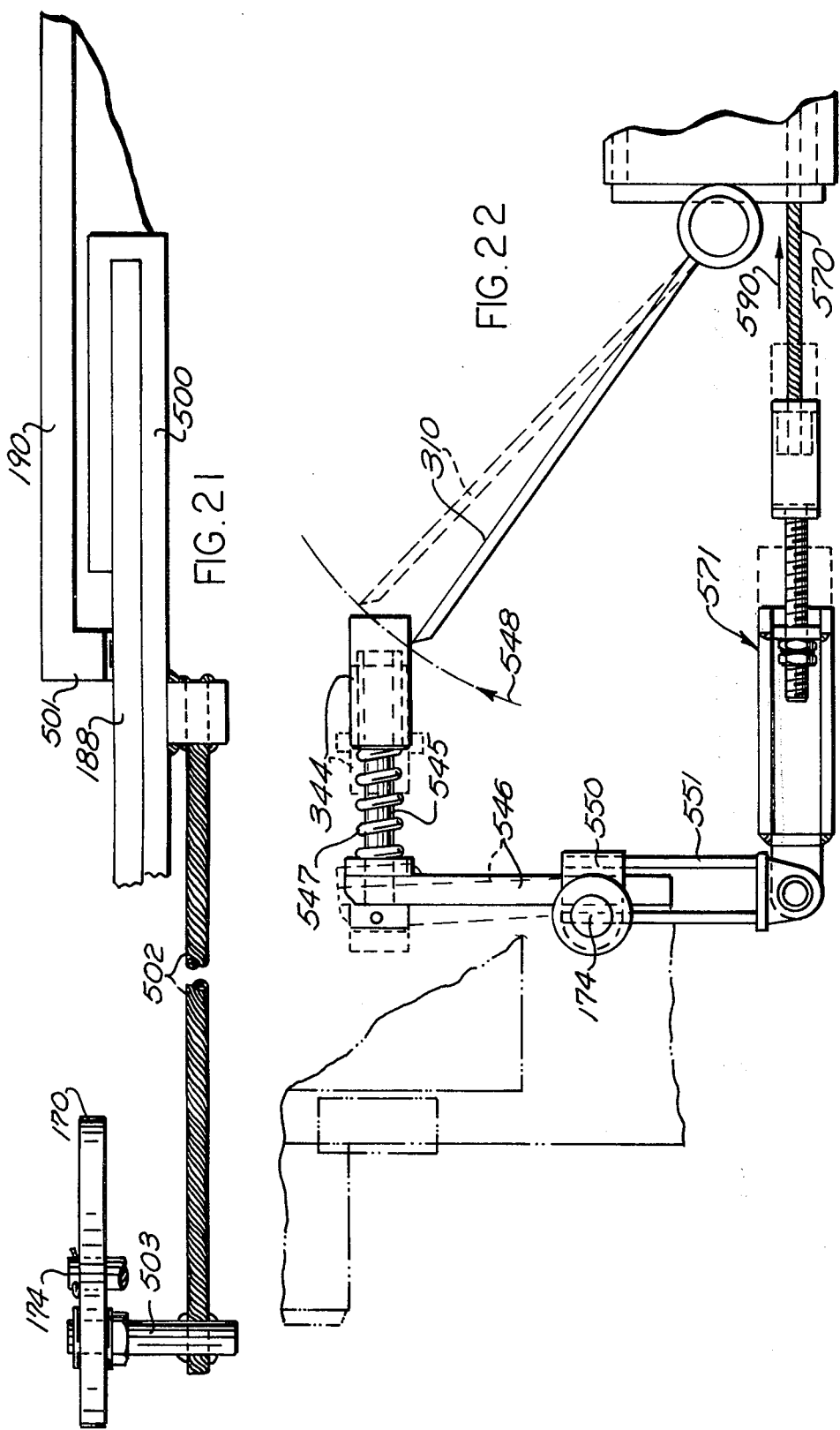

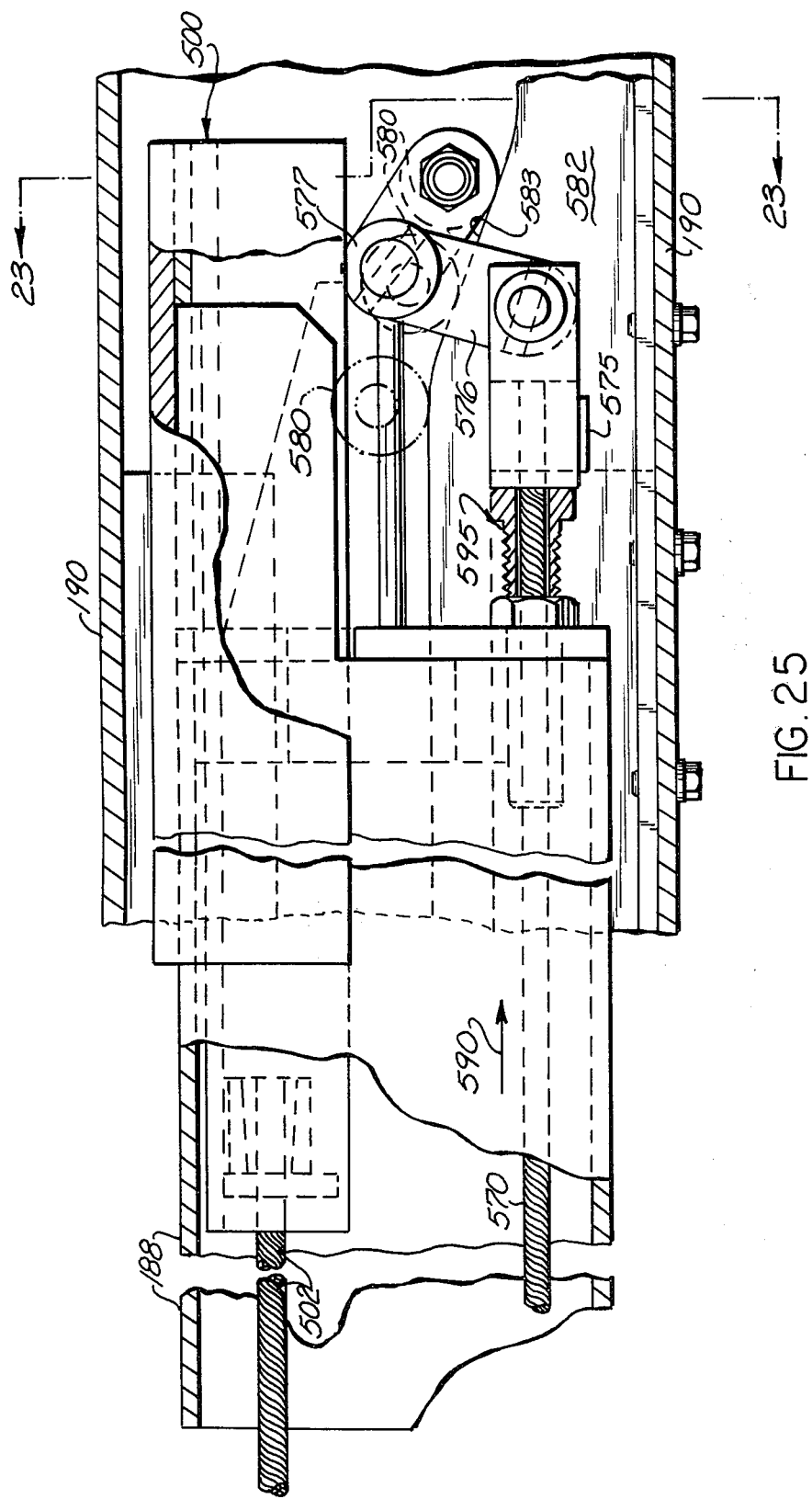

TREE HARVESTING APPARATUS

This is a division of application Ser. No. 888,746, filed Dec. 29, 1969, now U.S. Pat. No. 3,796,241.

The present invention relates to a new and improved method and apparatus for harvesting trees.

There are many known types of tree harvesting machines, such as the one disclosed in U.S. Pat. No. 3,353,575. While they have been more or less satisfactory in operation, these known machines have proven to be somewhat unsatisfactory for various reasons. The present invention is directed to a new and improved tree harvesting machine which is of a practical design, and capable of felling and processing trees in an efficient reliable manner.

It is an object of this invention to provide a new and improved tree harvesting machine which is readily maneuverable in forested areas, capable of relatively high speed operation, and operable to transport logs out of a forested area.

Another object of this invention is to provide a new and improved method and apparatus for harvesting trees wherein the trees are gripped with a clamp assembly and severed by a shear mechanism mounted on a first boom and are then delimbed and topped by apparatus mounted on a second boom while the tree is gripped by the clamp assembly on the first boom.

Another object of this invention is to provide a new and improved tree harvesting apparatus including a first boom having apparatus mounted thereon for gripping and severing a tree close to the ground and a second boom having a delimbing and topping mechanism mounted thereon for delimbing and topping a tree gripped by the apparatus on the first boom.

Another object of this invention is to provide a new and improved tree harvesting method and apparatus for delimbing a tree and topping the tree in response to a sensing of a portion of the tree having a predetermined cross-sectional dimension.

Another object of this invention is to provide a new and improved method and apparatus for topping a tree under the influence of relative movement in an axial direction between a tree and a topping assembly.

Still another object of this invention is to provide a new and improved tree harvesting apparatus including a bunk assembly from which logs are at least partially disengaged by operation of the bunk assembly to an open condition.

Yet another object of this invention is to provide a new and improved tree harvesting apparatus having a plurality of telescoping boom sections with a bearing assembly between the boom sections wherein the bearing assembly includes means for yieldably supporting the boom sections to enable limited movement to occur between the boom sections in a direction transverse to their direction of telescopic movement.

Another object of the present invention is the provision of a delimbing mechanism carried on a telescoping boom section which extends in a delimbing stroke and wherein the delimbing mechanism is operated to an open condition during the last part of the delimbing stroke of the telescoping boom.

Still another object of the present invention is the provision of a topping mechanism carried on a telescoping boom section and which is actuated in response to a sensing mechanism sensing a predetermined tree diameter and wherein means is provided for actuating the topping mechanism during the last part of the extension of the boom, if the tree diameter is somewhat greater than the predetermined diameter.

These and other objects and festures of the invention will become more apparent upon a consideration of the following description taken in combination with the accompanying drawings wherein:

FIG. 2 is a schematic illustration depicting the gripping of a standing tree with the clamp assembly on the first boom;

FIG. 3 is a schematic illustration, similar to FIG. 2, depicting the positioning of a severed tree for engagement by the delimbing mechanism mounted on the second boom;

FIG. 4 is a schematic illustration of the delimbing of a tree by extending the second boom to move the delimbing mechanism along the trunk of the tree;

FIG. 5 is a schematic illustration depicting the depositing of a log, formed by delimbing and topping a tree, in a bunk or clamp assembly which grips logs while they are dragged or pulled by the tree harvesting machine;

FIG. 6 is an enlarged schematic plan view illustrating the relationship between the two booms;

FIG. 7 is a schematic elevational view further illustrating the structure of the booms;

FIG. 8 is an elevational view illustrating the relationship between a tree shear assembly mounted on the first boom and the trunk of a tree to be severed by the shear assembly;

FIG. 9 is a partially broken away sectional view, taken generally along the line 9—9 of FIG. 8, further illustrating the construction of the tree shear assembly;

FIG. 14 is a schematic illustration of a cable arrangement for extending the second boom;

FIG. 15 is a schematic illustration depicting the relationship between the trunk of a tree, blades of the topping assembly, and the delimbing mechanism as the delimbing mechanism is moved along the tree trunk;

FIG. 16 is a schematic illustration depicting the relationship between the blades of the topping assembly and the tree trunk as the blades are released to effect a topping of the tree;

FIG. 17 is a schematic illustration of the severing of the tree trunk by the blades of the topping assembly;

FIG. 21 is a schematic view illustrating a mechanism for opening the delimber;

FIG. 22 is a view of a mechanism for triggering the topping of a tree during the last part of the extension of the second boom;

FIG. 25 is a fragmentary longitudinal sectional view of a portion of the booms illustrating still another part of the mechanism of FIG. 22.

Figure 1:
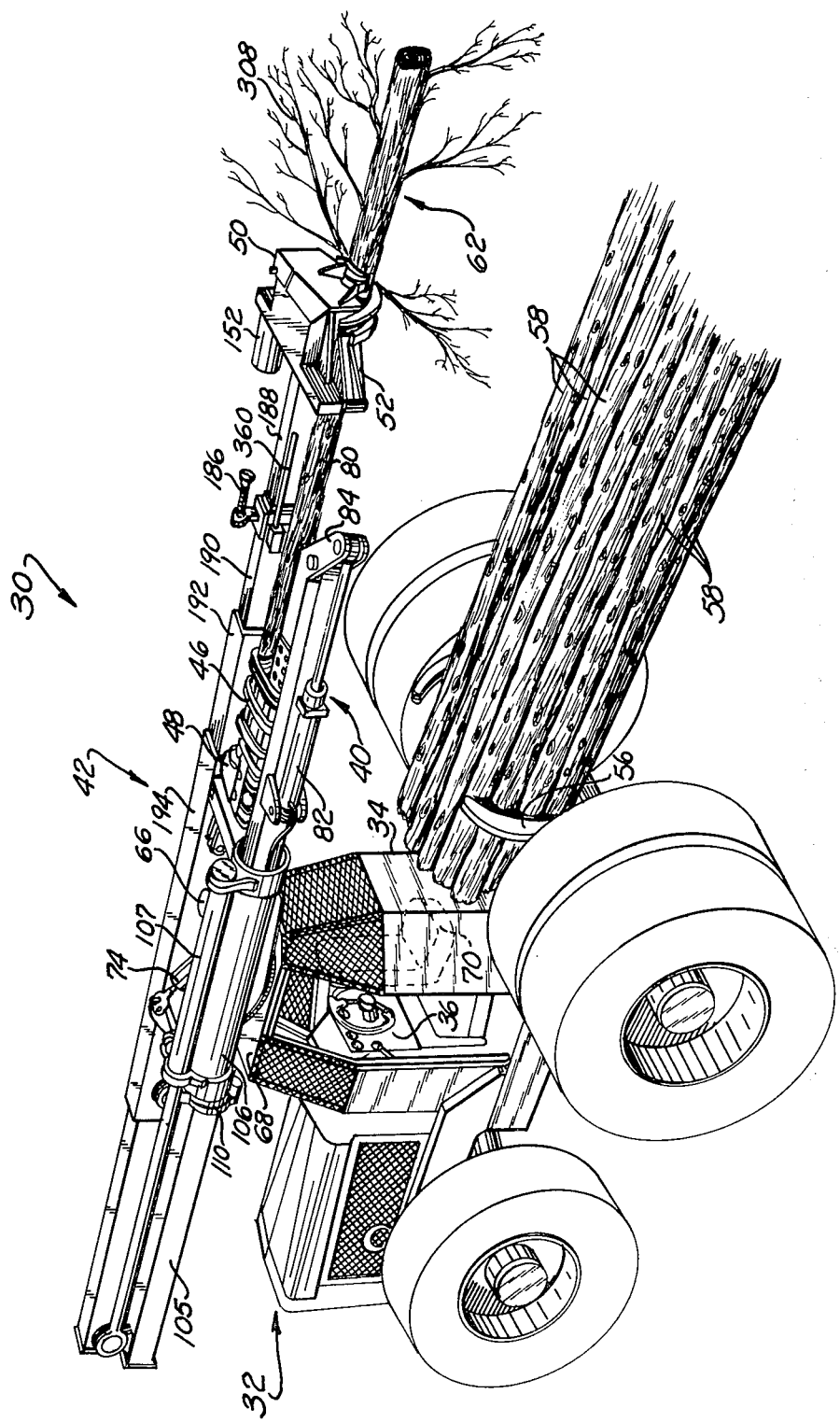
FIG. 1 is a schematic illustration of a tree harvesting machine constructed in accordance with the present invention, the tree harvesting machine being shown delimbing a tree held by a clamp assembly on a first boom with a delimbing mechanism on a second boom.

A preferred specific embodiment of a tree harvesting machine 30 constructed in accordance with the present invention is illustrated in FIG. 1. The tree harvesting machine 30 is operable to cut or sever a standing tree and to delimb and top the severed tree to form a log. When a number of trees has been so processed, the resulting logs are transported to another location by the tree harvesting machine 30.

The tree harvesting machine 30 includes an articulated vehicle 32 having an operator's cab 34. Suitable vehicular controls 36 are located in the operator's cab. In addition to the controls 36, other controls (not shown) are provided for controlling the operation of first and second booms 40 and 42. The controls for the first and second booms are supported for rotational movement with the seat 70 for the operator, so that the controls are readily operable in all positions of the seat. Any suitable structural arrangement may be provided to allow for movement of the controls and seat. A clamp assembly 46 for gripping a tree and a shear assembly 48 for severing the trunk of a tree are mounted on the first boom 40. A tree delimbing mechanism 50 and a tree topping assembly 52 are mounted on the second boom 42. The delimbing mechanism 50 and topping assembly 52 are movable along a severed tree gripped by the clamp assembly 46 to delimb and top the tree. In addition, a bunk or clamp assembly 56 is mounted on the vehicle 32 to grip logs 58 formed by operation of the tree harvesting machine 30.

The harvesting or processing of a standing tree 62 (FIG. 2) is initiated by pivoting the booms 40 and 42 toward the tree 62 about a vertical axis through the operator's cab 34. This pivoting movement of the booms 40 and 42 is effected by a hydraulic motor 66 mounted on a roof 68 of the operator's cab 34 (FIGS. 6 and 7). It should be noted that the pivoting movement of the booms 40 and 42 about the vertical axis results in the operator's seat 70 FIG. 2), which is connected to the booms by a frame 71, being moved with the booms so that the operator faces toward the operating ends of the booms. The booms 40 and 42 are then pivoted downwardly about a horizontal axis by extending piston and cylinder assemblies 72 and 74 to position the clamp assembly 46 at the base of a trunk 80 of the upright tree 62. The clamp assembly 46 is moved into engagement with the trunk 80 of the tree by operation of a cylinder assembly 82 which pivots a mounting arm 84 relative to the boom 40 to bring clamp arms 86 and 88 into engagement with the trunk 80 of the tree. An actuator cylinder 92 (see FIG. 6) is operable to move the clamp arms 86 and 88 into secure gripping engagement with the trunk 80 of the tree.

The trunk 80 of the tree is then severed by the tree shear assembly 48 (see FIGS. 2, 8 and 9). The tree shear assembly 48 is mounted directly beneath the clamp assembly 46 and includes a pair of rotatably mounted arms 96 and 98 having blades 100 and 102 (see FIGS. 8 and 9). The blades 100 and 102 are mounted on the arms 96 and 98, respectively, by suitable fasteners 104 which enable the blades 100, 102 to be disconnected from the associated arms and replaced if and when they become dull or worn. The arms 96 and 98 are pivoted between an open position (see FIG. 2) and a closed position (FIG. 9) by operation of a piston and cylinder assembly 104. The piston and cylinder assembly 104 is advantageously mounted above the blades 100 and 102 and the blades can shear or sever the trunk of the tree relatively close to the ground in a manner illustrated in FIG. 8.

Once the trunk 80 of the tree has been severed by operation of the shear assembly 48, the upright tree is moved to a generally horizontal position for delimbing (see FIG. 3). The severed tree 62 is positioned for delimbing by first pivoting the boom 40 upwardly from the position illustrated in FIG. 2 to raise the severed end of the tree 62 from its associated stump. The hydraulic motor 66 is then operated to swing the boom 42 about a vertical axis (see FIG. 3). In addition, a movable section 105 of the boom 40 is retracted relative to a fixed housing 106 by a piston and assembly 107 (FIG. 1) to position the severed end of the tree adjacent to the rear of the articulated vehicle 32. The piston and cylinder assembly 82 is then extended to pivot the arm 84 inwardly to orient the tree 62 in a generally horizontally extending position (FIG. 3) in which it is generally parallel to the booms 40, 42.

Figure 10:
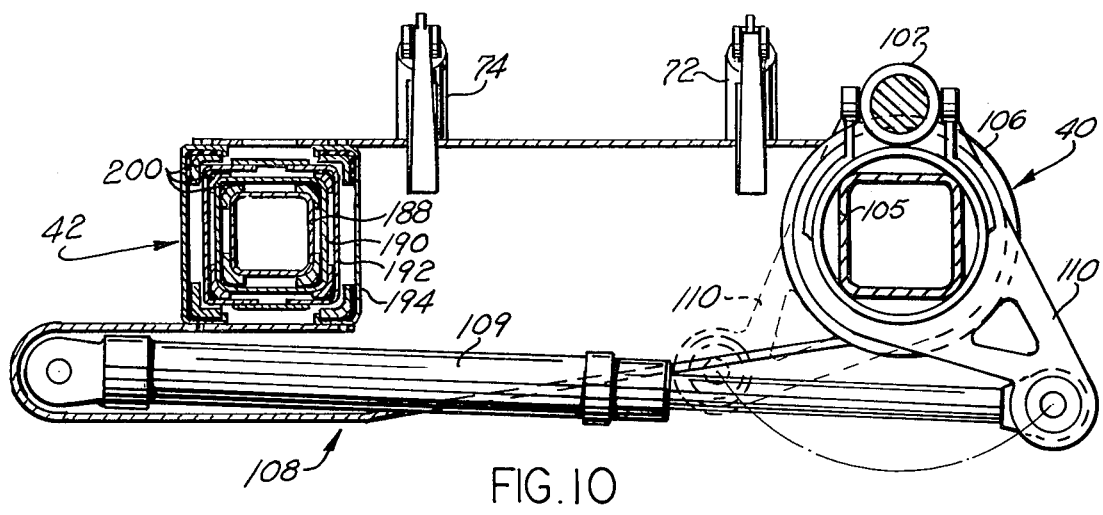
FIG. 10 is a sectional view, taken generally along the line 10—10 of FIG. 6, illustrating an assembly for pivoting the clamp assembly and a tree gripped thereby about a longitudinal axis of the first boom and into engagement with the delimbing mechanism mounted on the second boom.

The horizontally extending tree 62 is then pivoted about a longitudinally extending axis of the first boom 40 by operation of a positioning assembly 108 (FIG. 10). The positioning assembly 108 includes a piston and cylinder assembly 109 which is extended to rotate an actuator arm 110 secured to the housing 106. Extending the piston and cylinder assembly 109 rotates the arm 110 about a longitudinal axis of the boom 40, from the position shown in solid lines in FIG. 10 to the position shown in dashed lines in FIG. 10. This movement of the arm 110 rotates the boom 40 to move the clamp assembly 46 and the tree 62 upwardly from the position illustrated in FIG. 3 to the position shown in FIG. 1 so that the horizontally extending tree 62 can be engaged by a delimbing mechanism 50. The tree 62 is then delimbed by the delimbing mechanism 50 and topped by the topping assembly 52 while being held by the clamp assembly 46.

The delimbing mechanism 50 (see FIGS. 12 and 13) includes a pair of arms 126 and 128 which are pivotally mounted at 130 and 132 (FIG. 13) on a central support section 134 which is fixedly connected to a frame 138. The delimbing members or arms 126 and 128 are urged inwardly into engagement with the trunk 80 of a tree by a biasing assembly 142. This ensures that the arms 126 and 128 engage the trunk 80 of the tree even though the diameter of the trunk decreases along the tree in the manner illustrated schematically in dashed lines in FIG. 13.

Figure 12:
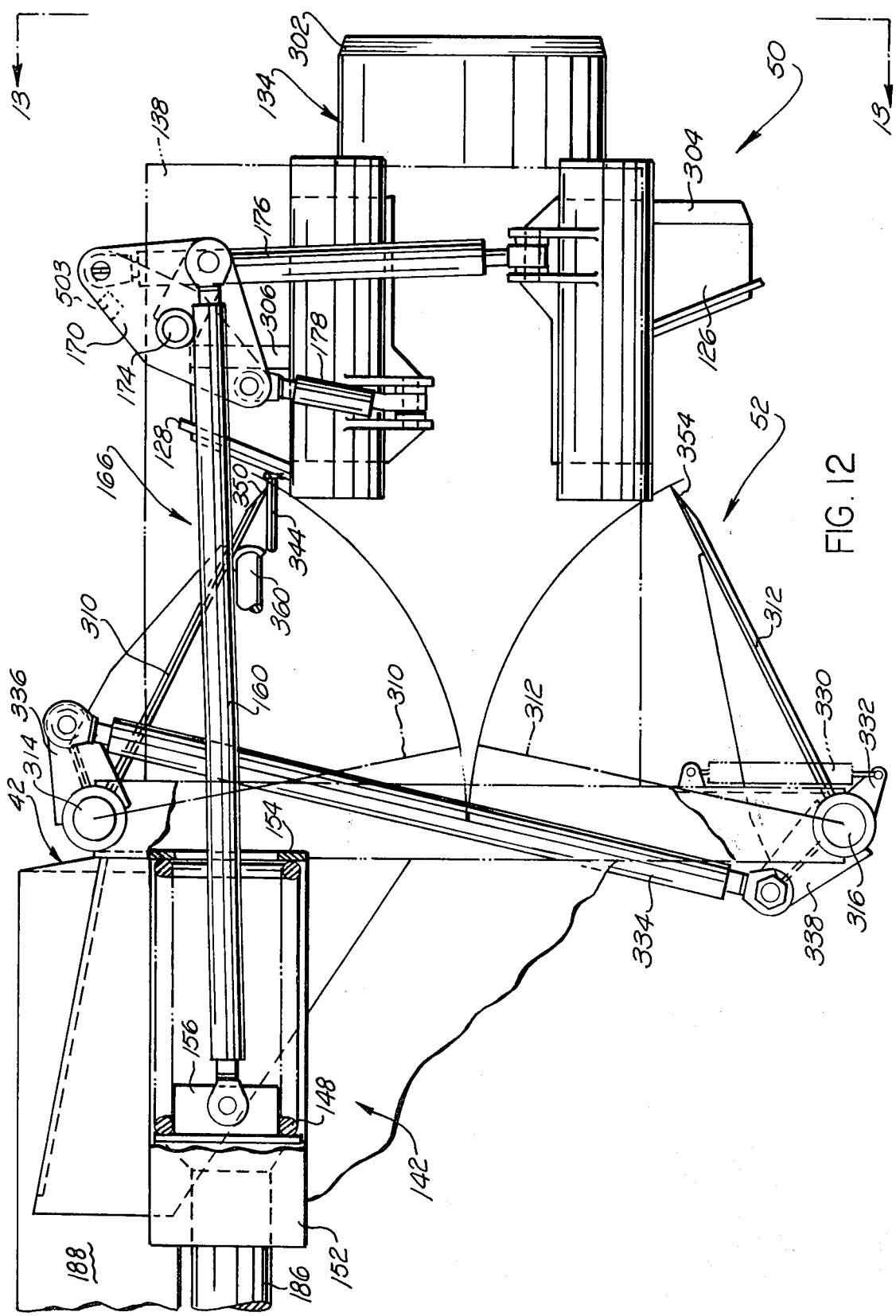
FIG. 12 is a partially broken away fragmentary sectional view illustrating the construction of the delimbing mechanism and the construction of the topping assembly.
Figure 13:
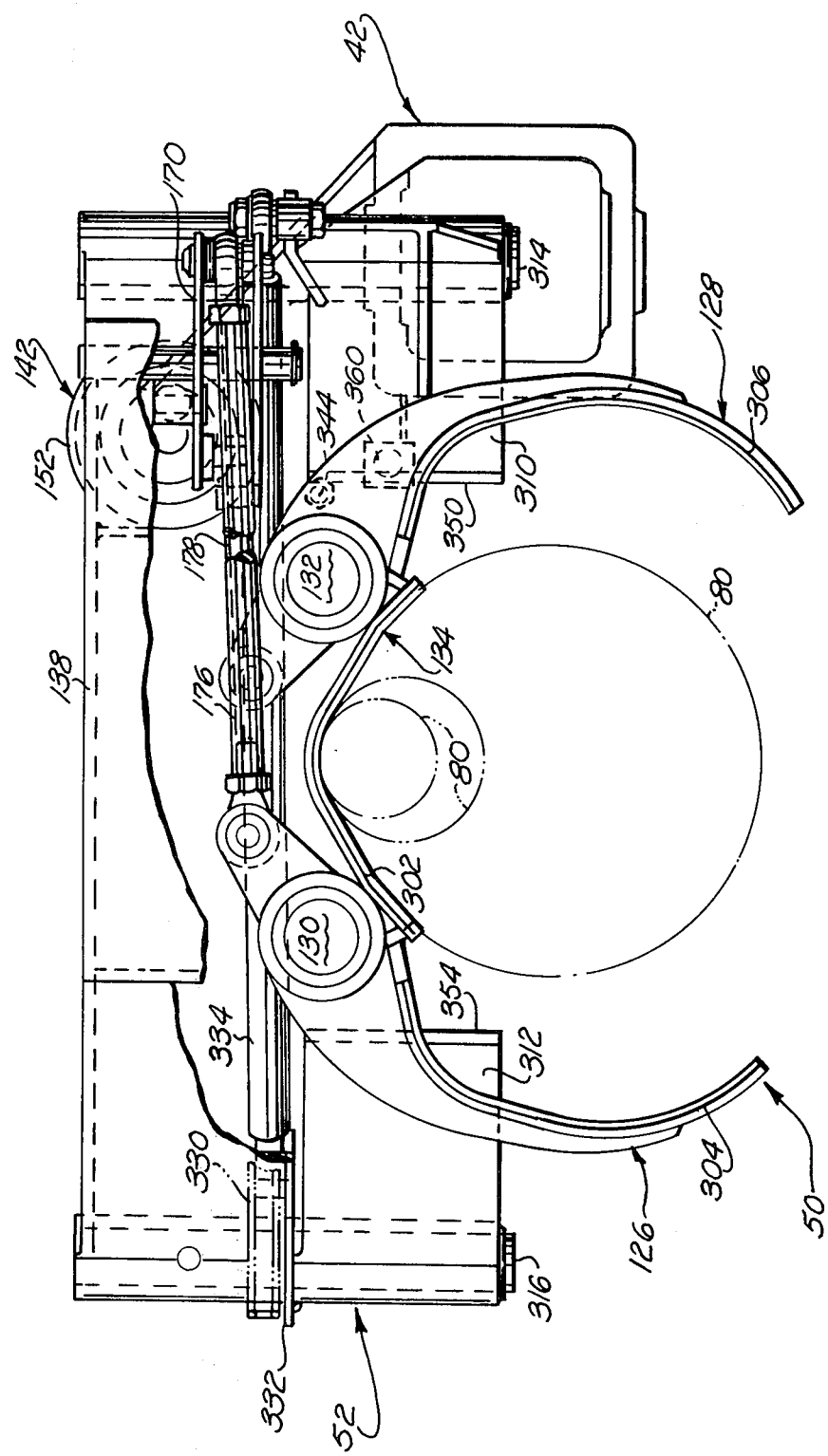
FIG. 13 is a fragmentary elevational view, taken generally along the line 13—13 of FIG. 12, further illustrating the relationship between the delimbing mechanism and the topping assembly.

The biasing assembly 142 (see FIG. 12) includes a spring 148 located in a cylindrical housing 152 between an end wall 154 of the housing and a piston or head element 156. The piston 156 is pivotally connected to a link 160 of a linkage arrangement 166 for interconnecting the biasing assembly 142 and the delimbing members 126 and 128. The spring 148 urges the piston 156 toward the left, as viewed in FIG. 12, to cause the link 160 to urge an actuator lever 170 in a generally clockwise direction about a pivot connection 174. The actuator lever 170 is connected by links 176 and 178 to the delimbing members 126 and 128 (FIGS. 12 and 13). When the actuator lever 170 is moved in a clockwise direction, as viewed in FIG. 12, under the influence of the biasing assembly 142, the link 176 is moved toward the left, as viewed in FIG. 13, to pivot the delimbing member or arm 126 inwardly about the pivot connection 130. similarly, the clockwise movement of the actuator lever 170, as viewed in FIG. 12, pulls the link 178 towards the right, as viewed in FIG. 13, to pivot the delimbing member or arm 128 inwardly about the pivot connection 132.

When the boom 42 is in the retracted position of FIGS. 6 and 7, an operator member 186 extends into the housing 152 of the biasing assembly 142 to press the piston 156 toward the right as viewed in FIG. 12 against the influence of the spring 148. This rightward movement of the piston 156 causes the linkage arrangement 166 to pivot the delimbing arms or members 126 and 128 outwardly to the open position of FIG. 13 to enable the trunk 80 of a severed tree to be positioned between the delimbing members 126 and 128 in the manner illustrated in dashed lines in FIG. 13.

Figure 11:
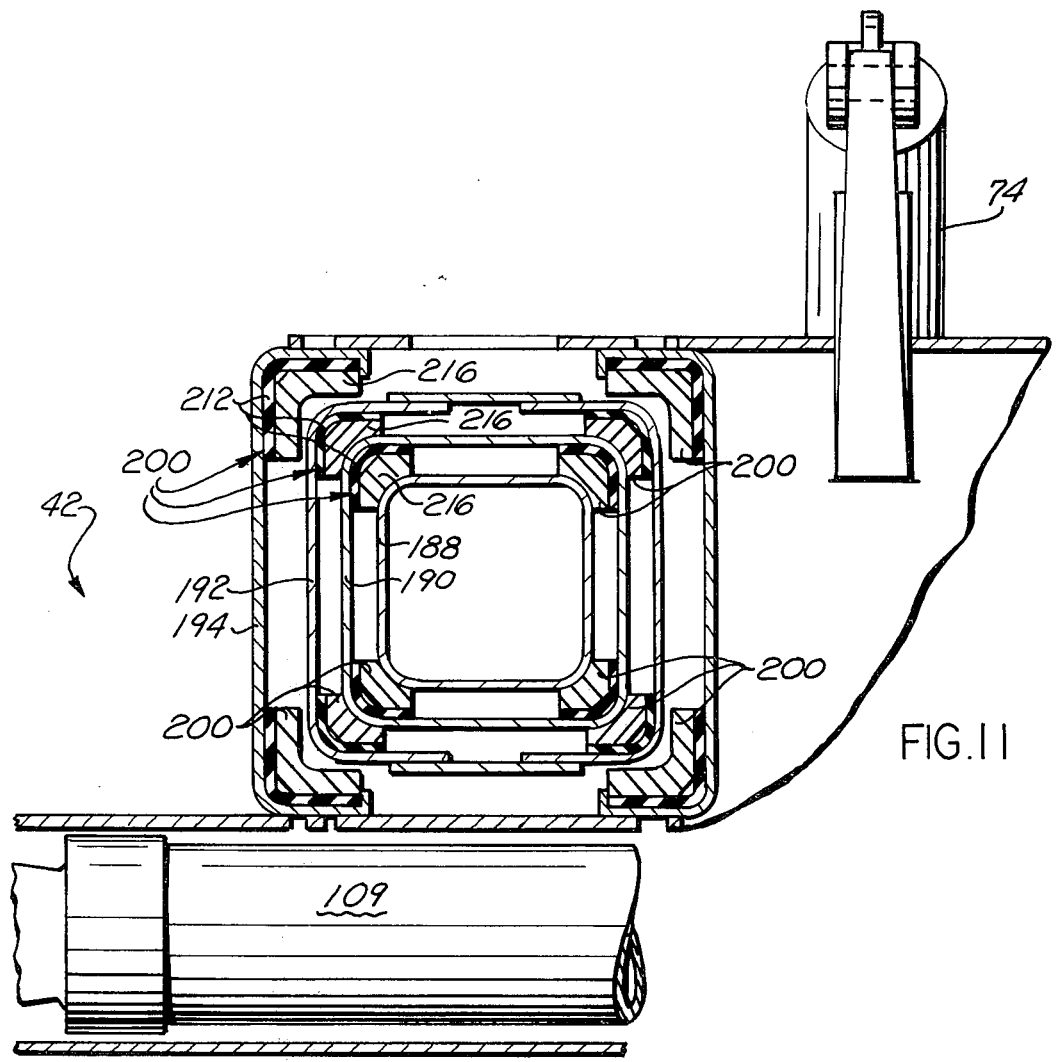
FIG. 11 is an enlarged fragmentary sectional view, similar to FIG. 10, illustrating the relationship between telescoping sections of the second boom and bearing assemblies for facilitating relative movement between these boom sections.

When the severed tree 62 is positioned relative to the delimbing mechanism 50 by the previously described operation of the boom 40 and clamp assembly 46, the boom 42 is extended outwardly to move the delimbing mechanism 50 along the horizontal trunk 80 of the tree 62 in the manner illustrated schematically in FIG. 4. To provide for this movement of the delimbing mechanism 50, the boom 42 includes a plurality of movable sections 188, 190 and 192 and a fixed section 194 which are mounted in a telescoping relationship with each other (see FIGS. 1, 4 and 11). Extending the boom 42 is facilitated by bearing elements 200 (FIG. 11) located between the sections 188, 190, 192 and 194 of the telescoping boom.

The bearing elements 200 each include a resilient or yieldable base or layer 212 formed of a suitable elastomeric or rubber-like material. The base 212 is fixedly connected to one of the sections 190, 192 or 194. A metallic bearing element 216 is mounted on each of the yieldable bases or layers 212. Each of the bearing elements 216 is slidably engaged by the next adjacent inner section of the telescoping boom whenever the boom is either extended or retracted. The yieldable base 212 enables the movable sections 188, 190 and 192 to deflect transversely to the direction in which they are being extended or retracted and also enables them to rotate to a certain extent about the longitudinal axis of the boom 42. Bearing elements, similar to the bearing elements 200, are provided between the fixed housing 106 and telescoping section 105 of the boom 40 to facilitate extending and retracting this boom.

It is contemplated that many different types of drive arrangements could be used to extend the boom 42. One such drive arrangement is a cable assembly 220, illustrated schematically in FIG. 14, which is operable to effect telescopic movement between the sections 188, 190, 192 and 194 of the boom 42. The cable assembly 220 includes an actuator assembly 224 mounted on the fixed outer section 194 of the boom 42. The actuator assembly 224 is expandable to extend the boom 42 and retractable to contract the boom. The cable assembly 220 includes a pair of pulleys 228 and 230 which are connected to opposite ends of the actuator assembly 224. The pulleys 228 and 230 are moved apart by extending the actuator assembly 224.

Moving the pulleys 228 and 230 apart pulls a cable 234 to effect outward movement of the boom section 192. The cable 234 is connected at an outer end 236 to the fixed section 194 of the boom 42 and at an inner end 238 to the movable section 192 of the boom. As the actuator assembly 224 is extended, the cable 234 is pulled toward the right, as viewed in FIG. 14, to move the boom section 192 outwardly relative to the boom section 194. This outward movement of the boom section 192 results in the boom section 190 being moved outwardly by a cable 242. The cable 242 is fixedly connected at an outer end 244 to the fixed boom section 194 and extends around an idler pulley 248 mounted on the movable boom section 190. An inner end of the cable 242 is connected at 250 to the boom section 190. Thus, upon outward movement of the section 192 of the boom 40, the cable 242 causes the boom section 190 to move outwardly. Contemporaneously therewith, the inner boom section 188 is moved outwardly relative to the boom section 190 by a cable 254 which is connected at an outer end 256 to the boom section 192 and extends around an idler pulley 260 mounted on the boom section 190 to an inner end 262 secured to the boom section 188. Of course, outward movement of the boom section 190 causes the pulley 260 to move outwardly relative to the boom section 192 to thereby move the innermost boom section 188 outwardly relative to the boom section 190.

The boom 42 is retracted in a similar manner by contracting the actutator assembly 224. Thus, the cable drive assembly 220 includes a cable 270 which extends around a pulley 272 which is moved to the left, as viewed in FIG. 14, by contracting the actuator assembly 224. Since the cable 270 is fixed at 276 to the outer boom section 194 and is secured at 280 to the boom section 192, when the piston and cylinder assembly 224 is contracted, the boom section 192 is moved toward the left. A cable 284 extends from a fixed outer connection 286, around a pulley 288 mounted on the boom section 192, to the inner connection 250 on the boom section 190. Therefore, leftward movement of the boom section 192 relative to the outer section 194 of the boom 42 results in the section 190 of the boom being pulled toward the left, as viewed in FIG. 14, by the cable 284. Similarly, a cable 292 is connected at an outer end 294 to the movable boom section 192 and extends around a pulley 298 to an inner connection 300 on the inner boom section 188. Therefore, inward movement of the boom section 190 results in the inner boom section 188 being retracted by the cable 292.

It should be noted that although a specific cable drive arrangement 220 has been illustrated schematically in FIG. 14, it is contemplated that other cable drive arrangements or suitable hydraulic drive arrangements could be utilized to extend and retract the boom 42. Since such cable and hydraulic drive arrangements are well known to those skilled in the art, it is believed that a further description of the cable drive arrangement 220 is not necessary at this time.

As the delimbing mechanism 50 is moved outwardly by extending the boom 42, a knife edge 302 formed on the central support portion 134 of the delimbing mechanism 50 (see FIGS. 12 and 13) and knife edges 304 and 306 formed on the delimbing members 126 and 128 are impacted against limbs or branches 308. This impacting severs the branches adjacent the trunk 80 of the tree to thereby strip or remove the branches from the trunk of the tree in the manner illustrated schematically in FIG. 4. During this outward movement of the delimbing mechanism 50, the biasing unit 142 operates the linkage arrangement 166 to press the delimbing members 126 and 128 into engagement with the trunk 80 of the tree even though the diameter or cross-sectional dimension of the trunk decreases as the delimbing mechanism 50 moves outwardly along the trunk.

After the delimbing mechanism 50 has been moved outwardly along the trunk 80 of the tree 62 until it is adjacent to a portion of the trunk 80 having a diameter at which it is desired to top or sever the trunk 80, the topping assembly 52 is automatically operated to top the tree. The topping assembly 52 includes a pair of pivotally mounted blades 310 and 312 (FIGS. 12 and 13) which are pivotally mounted at 314 and 316 for inward movement from an outermost position illustrated in solid lines in FIG. 12 to a severing position illustrated in dashed lines in FIG. 12. The blades 310 and 312 are urged inwardly toward the trunk 80 of the tree 62 by a biasing spring 330. The biasing spring urges an actuator arm 332 connected to the blade 312 in a counterclockwise direction, as viewed in FIG. 12. The blades 310 and 312 are interconnected by a link 334 which extends between actuator arms 336 and 338 to urge the blade 310 in a clockwise direction, as viewed in FIG. 12.

When the delimbing mechanism 50 is moving along the trunk 80 of the tree 62, the blades 310 and 312 are held in a spaced apart relationship with the trunk 80 of the tree (see FIGS. 12 and 15). To hold the blades 310 and 312 in this position against the urging of the biasing spring 330, a connector pin 344 on the delimbing member 128 engages a leading knife edge portion 350 of the blade 310. As the delimbing mechanism 50 moves outwardly along the trunk 80 of the tree, the diameter of cross-sectional dimension of the trunk decreases. As the cross-sectional dimension or diameter decreases, the delimbing members 126 and 128 are moved inwardly under the influence of the biasing assembly 142. This inward movement of the delimbing members 126 and 128 results in the knife edge portion 350 of the blade 310 clearing a rearward end portion of the pin 344 to enable the blades 310 and 312 to be pivoted into engagement with the trunk 80 of the tree in the manner illustrated schematically in FIG. 16.

Continued movement of the delimbing mechanism 50 and topping assembly 52 along the trunk of the tree causes the knife edges 350 and 354 on the blades 310 and 312 to be wedgingly forced into the trunk 80 to sever the trunk in the manner illustrated schematically in FIG. 17. Thus, the delimbing members 126 and 128 effectively sense the diameter of the tree trunk 80 as they are moved along the tree trunk and release the blades 310 and 312 when a predetermined diameter is encountered. The released blades then penetrate into the tree trunk 80 under the influence of continued outward movement of the topping assembly 52 to sever the tree trunk (FIG. 17). Since the delimbing members 126 and 128 sense the diameter of the tree trunk and effect operation of the topping assembly 52 when a predetermined trunk diameter is encountered, the topping assembly 52 is operated automatically at the proper time without an operator of the tree harvesting machine performing a control operation. This tends to speed up operation of the tree harvesting machine and minimizes the degree of skill required by the operator.

When the boom 42 is being retracted, an operator member 360 (FIG. 12) on the section 190 of the boom assembly, is moved into engagement with the blade 310. Continued retraction of the boom 42 pivots the blades 310 and 312 outwardly to the open condition. Continued retraction of the boom 42 also brings the operator member 186, which is mounted on the section 190 of the boom, into engagement with the piston 156. Therefore, the delimbing members 126 and 128 are swung outwardly after the knife edge 350 on the blade 310 has cleared the pin 344. Continued outward movement of the delimbing members 126 and 128 results in the delimbing members being swung to a position in which the pin 344 will hold the knife blades 310 and 312 from the trunk of the next tree to be delimbed.

The delimbed and topped tree 62 forms a log 58 (see FIG. 5) which is placed in the bunk assembly 56 by operation of the boom 40 and clamp assembly 46. To accomplish this, the boom 40 is rotated in the direction of the arrow in FIG. 5 by operation of the positioning assembly 108 from the position shown in dashed lines in FIG. 10 to the position shown in solid lines so that the end of the log 58 is clear of the delimbing mechanism 50. The boom 40 is then pivoted downwardly about a horizontal axis and the clamp assembly 48 swung outwardly by operation of the piston and cylinder assembly 82 to lower the end of the log into the bunk assembly 56. Finally, the clamp assembly 46 is operated to the open position to release the log 58. The boom assemblies 40 and 42 are then operated in the manner previously explained to grip, sever, delimb and top the next tree to be harvested.

Figure 18:
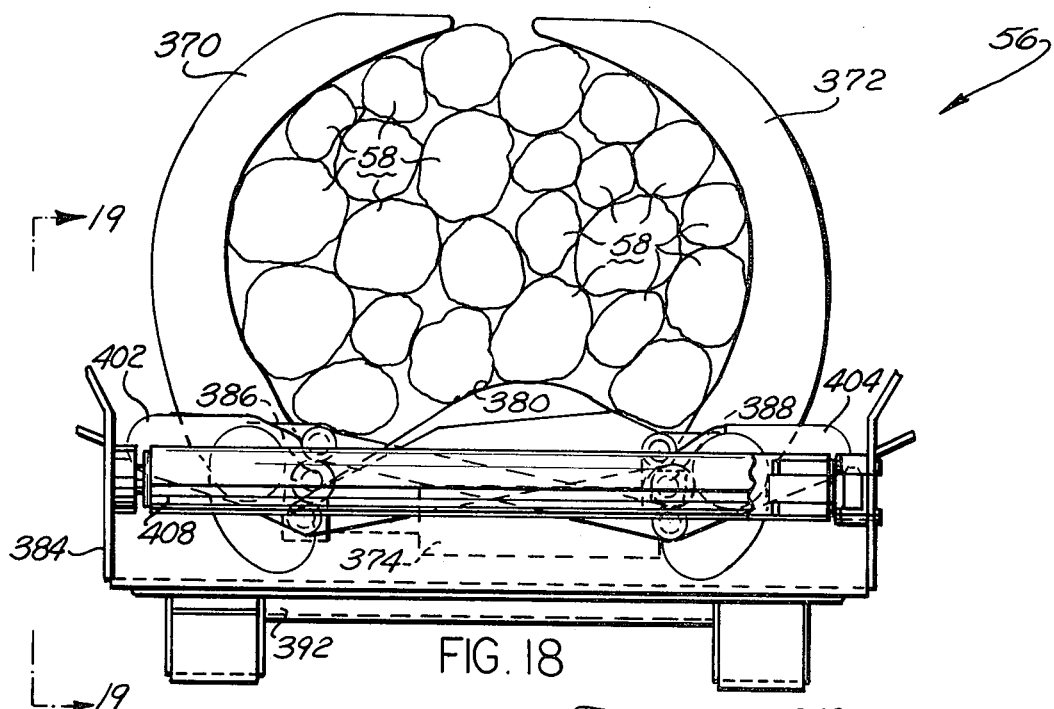
FIG. 18 is an elevational view of a bunk assembly for gripping logs to enable them to be dragged or pulled by the tree harvesting machine.

When a plurality of logs 58 have been placed in the bunk assembly 56, clamp arms 370 and 372 are pivoted to the closed condition illustrated in FIG. 18 by extending an actuator cylinder assembly 372 which operates a linkage arrangement 376 extending between the clamp arms 370 and 372. The linkage arrangement 376 moves the clamp arms 370 and 372 in the manner fully disclosed in application Ser. No. 822,906 filed by Symons et al on May 8, 1969 and entitled Logging Apparatus. In the closed condition, the clamp arms 370 and 372 press the logs 58 inwardly and downwardly toward a knife edge 380 extending between the clamp arms 370 and 372. The knife edge 380 penetrates the logs 58 to securely retain the logs against sliding movement relative to the bunk assembly 56 as the logs are being pulled or dragged by the vehicle 32.

Figure 19:
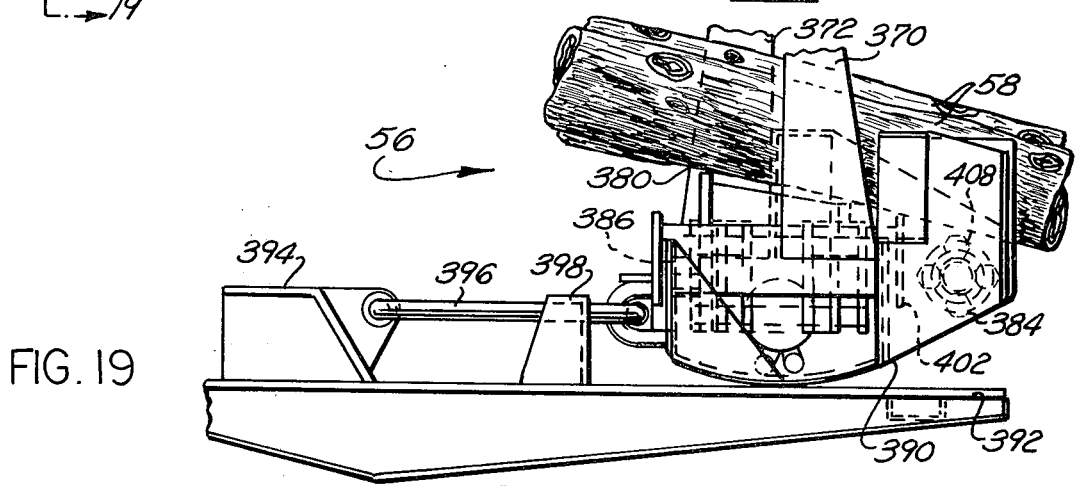
FIG. 19 is an elevational view, taken generally along the line 19—19 of FIG. 18, illustrating the relationship between the bunk assembly and a support platform.

The bunk assembly 56 includes a frame 384 to which the clamp arms 370 and 372 are pivotally connected by mounting pins 386 and 388. The frame 384 has an acurate bottom or base 390 which rests on a platform 392 on the vehicle 32 and is pivotally connected with a fixed mounting bracket 394 by a link 396 (FIG. 19). The link 396 enables the bunk assembly 56 to move sidewardly between the pair of stop members, only one stop member 398 being shown, while the vehicle 32 is pulling or transporting the logs 58.

Figure 20:
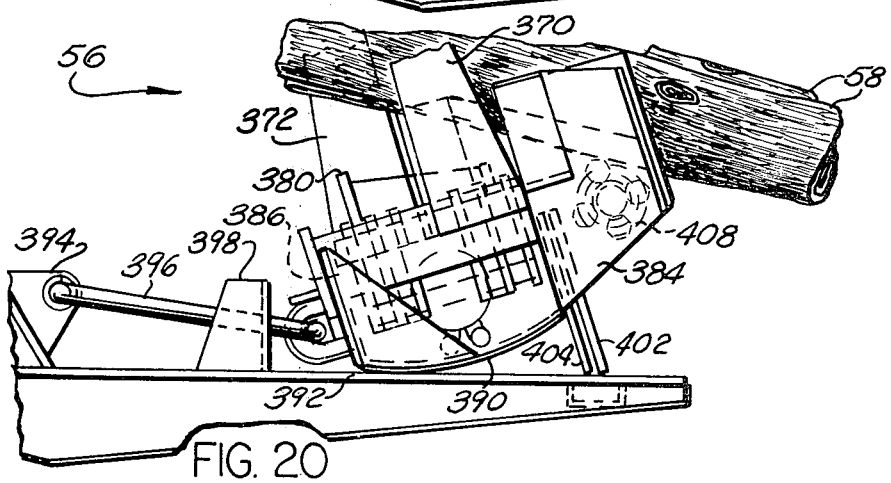
FIG. 20 is an elevational view, generally similar to FIG. 19, illustrating the bunk assembly in an open condition in which a support member or roller at least partially disengages the logs from the bunk assembly.

When the tree harvesting machine 30 is moved to a location where the logs 58 are to be dropped or dumped, it is necessary to disengage the logs from the knife edge 380. To accomplish this, cam elements 402 and 404 connected with the clamp arms 370 and 372 are pivoted about the pins 386 and 388 respectively as the clamp arms are moved to the open position. This pivoting movement of the cam elements 402 and 404 brings them into engagement with the platform 392 to rock the frame 384 upwardly and rearwardly in the manner illustrated in FIG. 20. This upward and rearward rocking or pivoting of the frame 384 raises a support member or roller 408 into engagement with the logs 58 to lift them up off the knife edge 380 (see FIG. 20). This disengages the logs 58 from the knife edge 380 so that they can be dropped or dumped by merely pulling the vehicle ahead and moving them along the roller 408.

Once the logs have been dumped, the tree harvesting machine 30 is driven back to a work area to process or harvest other trees. During movement of the vehicle 32 to and from a work area, it is important that the booms 40 and 42 and the apparatus mounted thereon be as compact as possible to facilitate maneuvering the tree harvesting machine 30. The previously described telescoping construction of the booms 40 and 42 enables the longitudinal extent of the booms to be minimized. In addition, the clamp assembly 46 and tree shear 48 are positionable in a traveling position between the booms 40 and 42 inwardly of the delimbing mechanism 50 and topping assembly 52 (see FIG. 6). When the clamp assembly 46 and tree shear 48 are in this traveling position, they are out of the way and provide a minimum of interference to the operator's vision.

In view of the foregoing description, it can be seen that the tree harvesting machine 30 includes a pair of telescopic booms 40 and 42. The clamp assembly 46 is mounted on the boom 40 and is operable to engage the trunk of a standing tree which is then severed by operation of the tree shear 48. The upright tree 62 is moved to a generally horizontal position (FIG. 3) by moving the clamp assembly 46 upwardly and inwardly toward the vehicle 32. The clamp assembly 46 is then pivoted about the longitudinal axis of the boom 40 to move the trunk 80 of the tree into engagement with the delimbing mechanism 50 The horizontal tree 62 is then delimbed by extending the boom 42 to move the delimbing mechanism 50 outwardly along the trunk of the tree while it is securely gripped by the clamp assembly 46.

When the delimbing members 126 and 128 sense that the trunk 80 has a predetermined relatively small diameter at which the tree 62 is to be topped, the blades 310 and 312 of the topping assembly 52 are released for movement into engagement with the trunk of the tree in the manner illustrated schematically in FIG. 16. Continued movement of the topping assembly 52 and delimbing mechanism 50 outwardly along the trunk of the tree results in the blades 310 and 312 being forced into the trunk of the tree to sever or top the tree. The log 58 resulting from the delimbing and topping of the tree 62 is then deposited in the bunk assembly 56 so that it can be pulled or dragged from the place where the tree was harvested by operation of the vehicle 32.

As described above, the tree harvesting apparatus illustrated in FIGS. 1–20 includes a delimbing mechanism which moves outwardly along the tree in a word stroke to effect delimbing of a tree. The delimbing mechanism also triggers the topping of the tree. The topping action is effected by the movement of the pin 344, which is carried by the delimbing arm 306, out of engagement with the topping blade 310 so that the topping blades 310, 312 may engage the tree and top the tree. This, of course, is effected when the diameter of the tree is sensed to be a predetermined minimum diameter, as described above. It is noted, however, that in the event the diameter of the tree is such that the pin 344 does not move out of engagement with the topping blade 310, the tree will not be topped in the embodiment of FIG. 12.

The mechanism to be described hereinbelow is constructed so that topping will be effected during the last portion of the extension of the boom, even though the diameter of the tree is somewhat larger than the predetermined minimum diameter at which topping normally is effected. Moreover, in the construction to be described hereinbelow, the delimbing mechanism is moved to its open position during the end of the stroke of the boom 188 which carries the delimbing mechanism. Accordingly, the major differences in the operation of the tree harvester to be described hereinbelow and that of the tree harvester described in the embodiments of FIGS. 1–20 is that the delimbing mechanism to be described below will be moved to its open position during the end of the stroke of the delimber, and, secondly, that the topping of the tree will be effected at the end of the stroke of the topping mechanism, even though the diameter of the tree may be somewhat larger than the predetermined minimum diameter at which topping normally occurs.

The construction shown in FIG. 21 is a schematic representation of the mechanism which provides for opening of the delimbing arms 304, 306 at the end of the outer stroke of the delimbing mechanism. As illustrated schematically in FIG. 21 the boom 188 which carries the delimbing mechanism moves into and out of the boom 190 in a telescoping relation, as described hereinabove. The boom 188 carries the delimbing mechanism on the outer end thereof. The delimbing mechanism, as described hereinabove, includes a link 170 which is mounted for pivotal movement about the pivot pin 174. As illustrated in FIG. 12, when the link 170 is moved in a counterclockwise direction about the axis of the pivot pin 174, the delimbing mechanism and delimbing arms are moved outwardly away from each other to an open position. The mechanism shown schematically in FIG. 22 is designed to effect pivoting of the link 170 in such a counterclockwise direction in response to the delimbing mechanism moving through the last portion of its work stroke.

As the boom 188 and boom 190 move outwardly in a work stroke, the boom 188 moves relative to the boom 190 in the last portion of the movement thereof, as should be understood from the pulley arrangement for moving the booms, as disclosed and described hereinabove. When the boom 188 begins moving relative to the boom 190, an angle member 500 which is carried for movement with the boom 188 engages a stop 501 on the boom member 190. As a result, the boom 188 can continue to move outwardly relative to the angle member 500. The angle member 500 has a cable 502 connected therewith, and the cable 502 is connected to a part 503 which, in turn, is connected to the link 170. The location at which part 503 is connected to link 170 is illustrated in FIG. 12 in dotted lines. As the boom 188 moves, the pivot pin 174 for the link 170 continues to move outwardly therewith. However, since the angle member 500 is stopped from outward movement, the result is that the cable 502 prevents the portion of the link 170 to which it is connected from moving outwardly, and the result is that the link 170 is pivoted about the pivot pin 174 in a counterclockwise direction, as shown in FIG. 12. The result of this action is that the delimbing arms are moved to an open position during the end of the stroke and more specifically, in response to the delimbing mechanism moving through the last portion of its work stroke. When the boom 188 returns or moves in its return stroke, the relative movement which occurred between the boom 188 and the angle member 500 is reversed and the angle member 500 is picked up by the boom 188 and moves along the boom 188 away from the stop 501. As a result, the link member 170 will rotate or return in a clockwise direction about the axis of the pin 174. However, nothing will be effected thereby in view of the fact that the tree may already have been dropped from the delimbing arms.

As noted above, the structure shown in FIGS. 22–25 also provides for topping of the tree, even though the predetermined minimum diameter of the tree at which topping normally occurs has not been reached. This is effected by mounting the pin 344 on the delimbing arms so that the pin 344 can be moved a predetermined distance out of engagement with the topping blade 310, even though the predetermined minimum diameter of the tree has not been reached, which would cause the pin 344 to move to a position relative to the tree so that the topping blades 310, 312 would effect topping of the tree, as described in connection with the embodiment of the tree harvester shown in FIG. 12.

The pin 344 in the embodiment of FIGS. 22–25 is moved in response to the delimbing mechanism and topping mechanism moving through the last part of their work stroke when the booms are extended. The pin 344 has a shank portion 545 thereon which is connected with a link member 546. A spring 547 biases the pin 344 toward the right, as viewed in FIG. 22. The pin 344 is secured to the delimbing arm 310 and moves radially of the tree inwardly in the direction of the arrow 548, illustrated in FIG. 22, as the delimbing arm 310 moves radially inwardly due to the reduction of the diameter of the tree. The link 546 has a sliding connection at 550 with a link member 551. The sliding connection at 550 provides for and allows the link 546 to move radially inwardly of the tree with the pin 344. This can be more clearly in FIG. 24 wherein the pin 344 tends to move in the arc designated 560 as the diameter of the tree reduces and the link 546 slides relative to link 551 and moves between the positions illustrated in dotted and full lines in FIG. 24.

In this construction, the pivot shaft 174 for the delimber link 170 is extended so as to support the link 551 for pivotal movement relative to the boom 188 about the axis of the shaft 174. It should be apparent, of course, that upon pivoting movement of the link 551 about the axis of the shaft 174, the pin 344 will be moved to its dotted position, illustrated in FIG. 22. When in its dotted position, the pin 344 may allow the topping blades 310, 312 to move into engagement with the tree and effect topping thereof during the last portion of the work stroke thereof.

The link 551 is moved about the axis of the pin 174 by a cable 570 which is connected at one end to a connector 571 which, in turn, is connected to the link 551. The cable 570 is connected at its other end, as illustrated in FIG. 25 to a connector 575. The connector 575, in turn, is pivotally connected to a link 576, which, in turn, is connected to a pin 577 which extends transverse to the direction of movement of the booms. The pin 577, more specifically, is carried by the boom 188 which is the innermost boom and which moves outwardly relative to the boom 190 during the last portion of the work stroke of the delimber, as described above.

Figure 23:
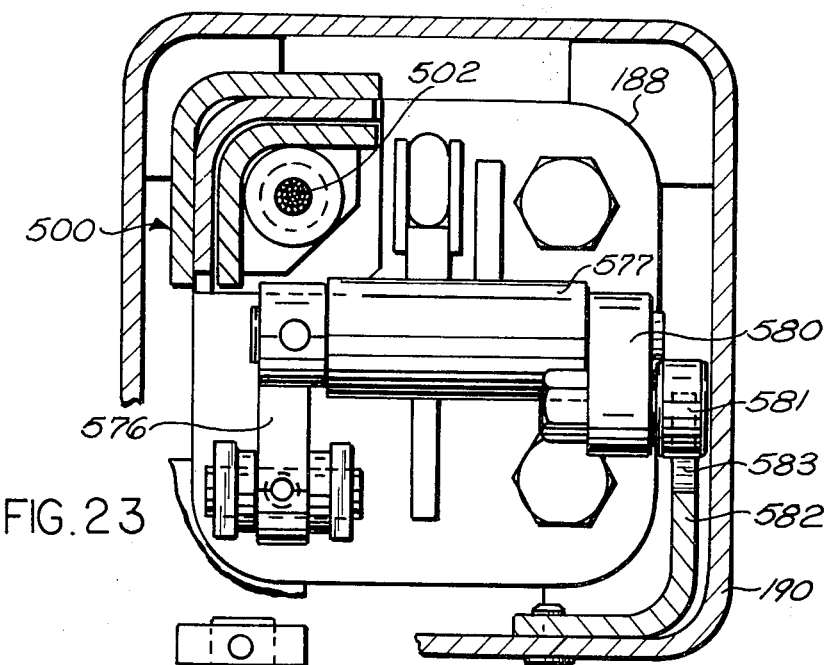
FIG. 23 is a fragmentary sectional view through the outer portion of the booms and taken approximately along lines 23—23 of FIG. 25.
Figure 24:
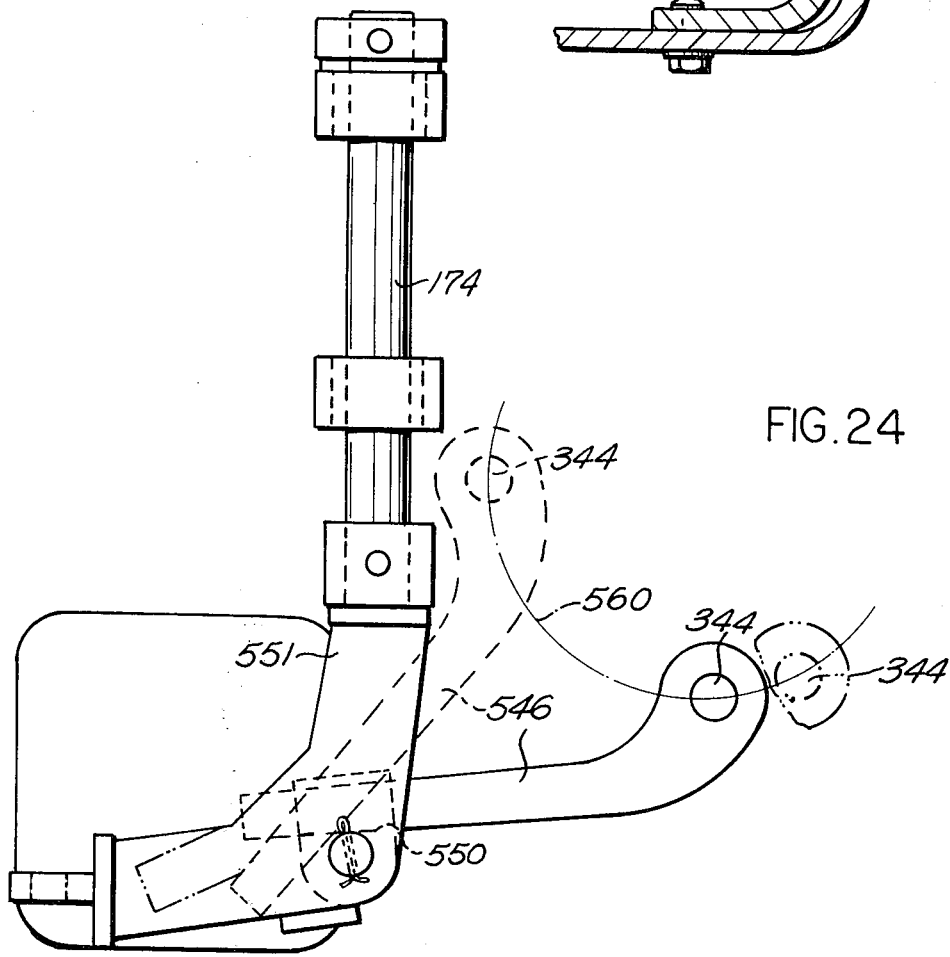
FIG. 24 is another view of the mechanism for triggering topping of a tree.

The pin 577 has a link member 580 pivotally connected thereto at the side thereof opposite the side to which the link 576 is connected. This is best shown in FIG. 23. A roller 581 is carried by the link 580.

The roller 581 is adapted to engage a cam 582 which is fixedly connected to the boom 180 at the outermost end thereof. When the roller 581 moves up the ramp 583 of the cam 582, the link 580 is moved in a counterclockwise direction, as illustrated in FIG. 25, which, in turn, effects a counterclockwise movement of the link 576, as illustrated in FIG. 25. The counterclockwise movement of the link 576 results in the cable 570 being moved in the direction of the arrow 590 in FIGS. 22 and 25. As noted above, movement of the cable 570 in the direction of the arrow 590 will effect pivoting of the link 551 and a movement of the pin 344 in a direction away from the topping blade 310. If the movement provided is sufficient to cause the pin 344 to move out of engagement with the topping blade 310, the topping blade will effect topping of the tree during the last portion of the stroke of the boom 188, as described above.

A suitable adjustment mechanism 595 is provided between the cable 590 and the link 576. The adjustment mechanism 595 comprises a nut and screw arrangement and by relative movement therebetween, can effect the position of the roller 581 relative to the ramp 583. In this manner, the distance through which the roller moves can be adjusted, thereby adjusting the amount of movement of the pin 344.

Accordingly, the construction which provides for movement of the pin 344 at the end of the work stroke, even though the pin is still in engagement with the topping blade 310 will result in topping of trees which are of a larger diameter than that which normally are topped during the major portion of the work stroke. Accordingly, the mechanism shown in FIG. 24 will effect topping of a tree when the delimbing mechanism, for example, encounters a 3-inch diameter portion of the tree, even though the delimbing mechanism and topper have not reached the end of their stroke. This is effected because the pin 344, in such a case, moves radially inwardly toward the tree a sufficient distance to allow the topping blades 310, 312 to engage the tree, as described above in connection with the modification shown in FIG. 12. However, the construction shown in FIG. 24 also will provide for topping of a tree between a 3-inch diameter and a 5-inch diameter, for example, at the end of the work stroke of the booms. This is effected because, even though the pin 344 has not moved radially inwardly of the tree to a position which would allow the topping blades 310, 312 to engage the tree and effect topping thereof, the pin 344 is moved generally longitudinally of the boom by the mechanism shown in FIGS. 22, 25 so as to move away from the topping blade 310. This movement will be sufficient to cause the topping blades 310, 312 to top a tree which is of a greater diameter than that at which normal topping is effected, but will not be sufficiently great so as to effect topping of a tree which is of too large a diameter, such as greater than 5 inches. Accordingly, this mechanism will effect topping of a tree at the end of the stroke of the delimbing mechanism, which is greater than that at which normal topping is effected, but which is of a diameter less than that which it capable of topping.

Having described a specific preferred embodiment of the invention, the following is claimed:

1. Apparatus for use in association with a vehicle for harvesting and transporting trees, said apparatus comprising a clamp assembly comprising a pair of arms adapted to be mounted on the vehicle for gripping logs to be transported, said pair of arms being operable between a closed condition in which the logs are held against a lower portion of said clamp assembly to retard relative movement between the logs and the vehicle while the logs are being transported and an open condition in which the logs are released, and a roller mounted on the frame of said clamp assembly and movable upwardly against the logs for raising the logs off said lower portion of said clamp assembly in response to operation of said arms from said closed condition to said open condition to thereby facilitate disengaging the logs from said clamp assembly.

2. Apparatus for use in association with a vehicle for harvesting and transporting trees; said apparatus comprising a clamp assembly adapted to be mounted on the vehicle for gripping logs to be transported, said clamp assembly being supported by a pivotal frame and operable between a closed condition in which the logs are held against a lower portion of said clamp assembly to retard relative movement between the logs and the vehicle while the logs are being transported and an open condition in which the logs are released; a support member operatively connected to said clamp assembly; and means for pivoting said frame in response to operation of said clamp assembly to the open condition to raise said support member to lift the logs off the lower portion of said clamp assembly.

3. Apparatus as set forth in claim 2 wherein said frame includes an arcuate lower surface which is adapted to be rockably disposed on a generally planar support surface of the vehicle, said means for pivoting said frame including a member for pressing against the vehicle to rock said frame in response to operation of said clamp assembly to the open condition to thereby move said support member and logs upwardly.

4. Apparatus as set forth in claim 2 further including knife edge means located on the lower portion of said clamp assembly for penetrating and securely engaging at least some of the logs gripped by said clamp assembly when said clamp assembly is in the closed condition, said means for raising the logs being operable to disengage the logs from said knife edge means in response to operation of said clamp assembly to the open condition.

* * * * *